Jan. 31, 1956     B. H. VINE     2,733,115
APPARATUS FOR EVAPORATING CHEMICALS
Filed April 1, 1952
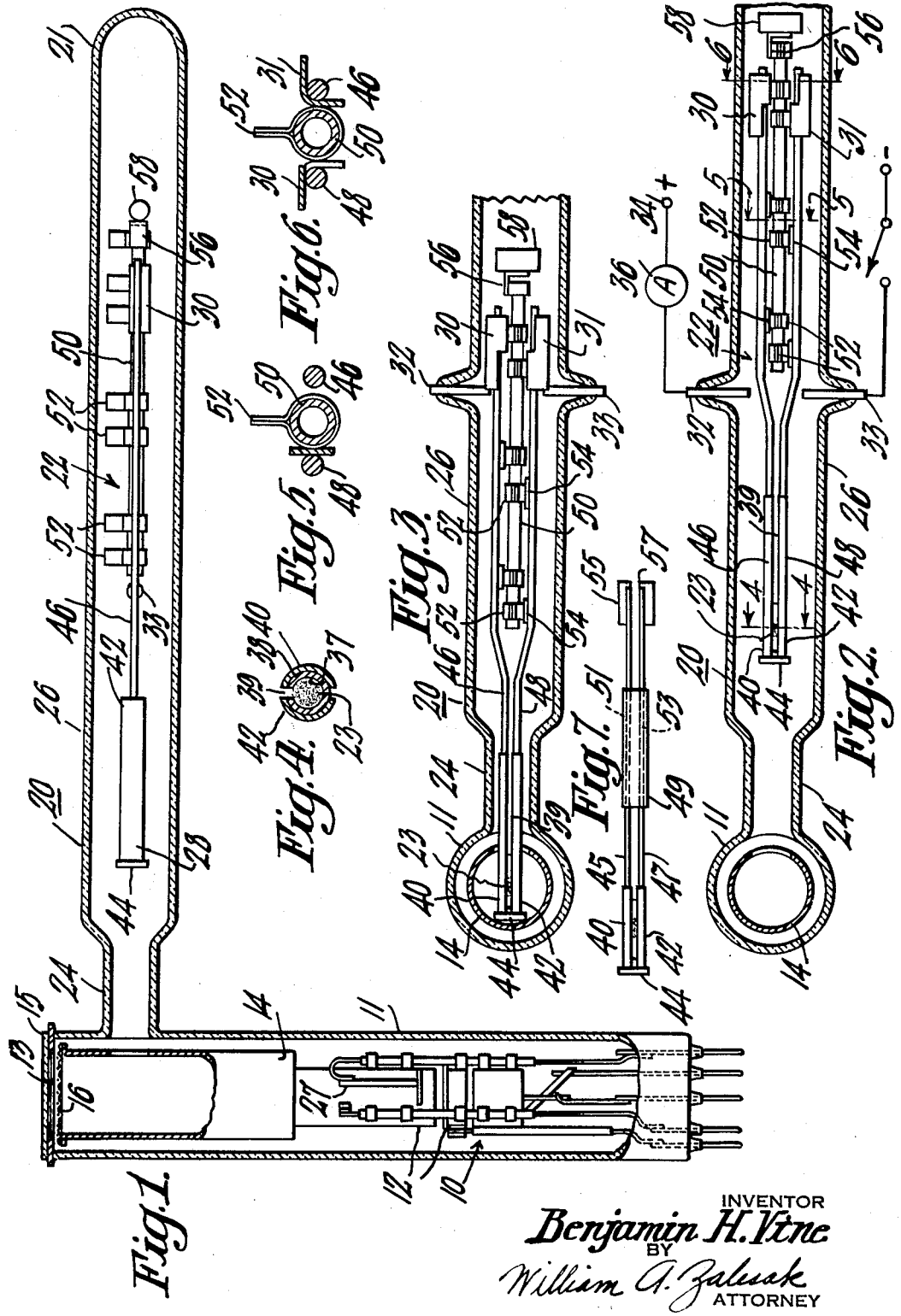
INVENTOR
Benjamin H. Vine
BY
William A. Zalesak
ATTORNEY

United States Patent Office 2,733,115
Patented Jan. 31, 1956

2,733,115

APPARATUS FOR EVAPORATING CHEMICALS

Benjamin H. Vine, Lancaster, Pa., assignor to Radio Corporation of America, a corporation of Delaware Application April 1, 1952, Serial No. 279,883

10 Claims. (Cl. 316—30)

This invention relates to apparatus for use in evaporation processes and particularly to apparatus for manufacturing certain kinds of electron discharge devices.

In the electronic arts, many devices such as camera pickup tubes of the Vidicon or Image Orthicon type, phototubes and the like, utilize targets or photocathodes or other elements having films of photoelectric material which may be deposited by an evaporation process. Selenium and antimony trisulfide are typical examples of photoconductive materials which are often used in such tube applications. Caesium, caesium and silver and oxygen, and caesium and silver and antimony are examples of photoemissive materials which are also used in such applications.

In the preparation of one of the aforementioned electron tubes, the tube and its components must be processed in conventional fashion by several operations including baking. Such baking is employed to degas and dehumidify the tube envelope and the included components. To accomplish effective baking out, the process must be carried out at comparatively high temperatures in the range of 400° C. to 450° C.

The tube processing procedure is complicated by the fact that most photoelectric materials are subject to deleterious changes at such high temperatures. For example, the material, if in the form of a film on a target, may evaporate or transmute into an undesirable crystal structure. Thus the problem arises as to the proper method of preparation and the proper time during the preparation of such an electron tube, to deposit the photoelectric material on the target. It is clear that coating the target before processing the tube is undesirable because the target area could not then be properly degassed, dehumidified and the like without upsetting the photoelectric film.

An alternative is to mount the tube components within the tube, process the tube components completely and then evaporate the photoelectric material onto the target. This is the most desirable procedure and is generally effected by providing the electron tube envelope with a side tube or appendage which is used in the evaporation process. Some form of evaporator carrying the photoelectric material to be evaporated is inserted, after tube processing, through the side tube and into the electron tube envelope so that the photoelectric chemical is in proper position to be evaporated onto the target.

At this point another problem arises. The problem here concerns the method of evaporating the photoelectric material from its carrier in the evaporator assembly and on to the target. In order to deposit an optimum amount of photoelectric material, the evaporation procedure must be effected at a controlled rate and hence at a controlled temperature. There are several methods for evaporating photoelectric material onto a target within a tube. According to one method the tube and evaporator assembly are inserted directly into some form of oven. According to another method, a high frequency induction coil is positioned adjacent to the evaporator whereby electrical currents are induced in the evaporator. The induced currents heat the evaporator and evaporate the photoelectric material. However, neither of these methods provides the strict control of evaporation temperatures desired. Thus the basic problem, which is not solved satisfactorily in the prior art, is to provide an evaporator which can be moved into and out of evaporating position and which can be heated by an easily controllable method.

Accordingly, the principal object of this invention is to provide an improved apparatus for evaporating a chemical substance onto a target area within a container whereby the evaporation procedure is strictly controlled.

Another object is to provide an evaporator apparatus which may be moved into and out of evaporation position and which may be strictly controlled in operation.

Another object is to provide an improved and easily controlled apparatus for coating a target with a photoelectric film.

Another object is to provide an apparatus for evaporating a chemical substance within a hermetically sealed envelope by heating directly by conductive rather than by electromagnetically induced current flow.

In general, the objects and purposes of this invention are accomplished by the provision of an elongated evaporator or carrier for the chemical material to be deposited within the envelope of an electron tube. On the carrier are mounted conductive contacts. In addition, a side tubulation is provided extending from the tube envelope and a pair of conductive terminal pins are mounted in the tubulation. The pins are connected to a suitable source of alternating or direct current. By this arrangement, when the carrier is moved from the side tubulation into the tube envelope, the contacts thereon contact the pins in the side tube and an electric current path is completed through the evaporator. Thus the evaporator is heated and the chemical agent evaporated onto the target by means of a precise and easily controllable electric circuit.

The invention is described in detail with respect to the drawings wherein:

Fig. 1 is a view in elevation and partly in section, of an electron discharge tube envelope having the side tubulation and evaporator of the invention;

Fig. 2 is a plan view, partly in section, of the apparatus shown in Fig. 1 wherein the evaporator of the invention is in retracted position;

Fig. 3 is a plan view, partly in section, of the apparatus shown in Fig. 1 wherein the evaporator of the invention is in charge-evaporating position;

Figure 4 is a sectional view along the lines 4—4 in Fig. 2 of only the evaporator;

Fig. 5 is a sectional view along the lines 5—5 in Fig. 2 of only the evaporator;

Fig. 6 is a sectional view along the lines 6—6 in Fig. 2 of only the evaporator; and, Fig. 7 is a plan view of another embodiment of the evaporator of the invention.

In Figure 1, an electron tube envelope 11, for example, a Vidicon is provided with an electron gun 10 including a suitable number of electrodes 12, and getters 27, and a tubular accelerating electrode 14 having a mesh screen electrode 16 mounted at one end thereof. A layer 13 of transparent conductive material, for example a layer of the type which may be formed by pyrolitic deposition from a mixture of air or oxygen and the vapors of tin (stannic) chloride in methanol, is coated on the inner surface of the face plate 15 of the envelope 11. The photoconductive layer is not deposited on the conductive layer 13 at this time. The tube envelope 11 is also provided with a side tubulation or appendage 20 extending outwardly therefrom through which an evaporator 22 may be inserted into the tube envelope. The side appendage 20 comprises a narrow cylindrical portion 24 and an expanded cylindrical portion 26.

In accordance with the invention, there is provided an evaporator assembly 22 comprising a boat or carrier 38 of glass or some other suitable inert, non-conductor, having a substantially rectangular opening 39 (Fig. 4) leading to the inner chamber 37 of the boat. The photoconductive charge 23 is inserted into the boat 38 through the opening 39. The boat is thus made of inert, non-conductive material so that there will be no possibility of the chemical charge becoming contaminated by reacting with its supporting medium. In addition, with the boat made of non-conductive material, direct electrical current will not flow therethrough. Such an arrangement is desirable because it simplifies the problems of design of the boat and positioning of the charge within the boat. The boat 38 is mounted and retained between two conductive arcuate members or strips 40 and 42 which are made of some suitable resistive heating material such as a nickel-chromium alloy. As shown in Fig. 4, the arcuate members are in direct contact with and enclose substantially the entire boat 38. With this arrangement of the boat and the arcuate members, efficient heat transfer is provided through the carrier to the chemical to be evaporated. A conductive end piece 44 is connected between the two members 40 and 42 so that an electrical circuit may be connected between them. The glass receptacle or carrier 38 is carried between the arcuate members at a suitable distance from the conductive end piece 44. The position of the boat is adjustable and is determined by the target container and the size and position of the target area itself. The arcuate members 40 and 42 in turn are connected to two conductive members or rods 46 and 48 respectively which are parallel for a distance and then diverge and finally resume parallel paths with a wider separation between them. The rearward portions of the rods 46 and 48 are spaced apart and insulatingly supported in separated position by a rod 50 of ceramic or other suitable material having a plurality of metal clamps 52 and metal spacer elements 54 connected thereto at intervals along its length.

A bracket 56 is bonded to one of the clamps 52 which is mounted approximately at the back end of the insulating rod 50. A cylindrical slug 58 of magnetic material is suitably connected to the bracket 56. The slug 58 is provided to cooperate with a magnet which may be used to move the evaporator within the side tube. A pair of contacts or wings 30 and 31 made of a conductive material are suitably positioned on the apparatus by welding one to each of the conductive members 46 and 48 as shown in Fig. 5.

According to the invention electrically conductive means are provided in the side appendage 20 to cooperate with the contacts 30, 31. In this embodiment of the invention such conductive means are the terminals or terminal pins 32 and 33 (Figs. 2 and 3) which are embedded in the wall of the side appendage 20. The terminal pins 32 and 33 are connected to a suitable source of voltage 34 through a meter 36. The contact wings are so positioned that they contact and rest on the terminal pins 32, 33 in the side tube when the evaporator is inserted into evaporating position in the tube 11. All of the aforementioned parts of the evaporator may be joined by welding or by some other suitable procedure.

In an alternative embodiment of the evaporator, as shown in Figure 7, the boat or carrier 38 is supported between the arcuate members 40 and 42 which are electrically connected at one of their ends by means of the conductive end piece 44. The other ends of the members 40 and 42 are connected to conductive rods 45 and 47 which are supported and insulatingly separated by means of a ceramic support 49 having two separate passageways 51 and 53 formed in its body. The rods 45 and 47 extend through the passageways and at their free ends contact wings 55 and 57 are mounted. In this embodiment, the contact wings themselves are made of some magnetic material, such as steel, so that a magnet may be used in cooperation with the wings to slide the evaporator along the side appendage 20.

After the electron gun and other components are mounted in the Vidicon envelope 11, the evaporator 22 is charged with the material 23 to be evaporated and inserted into the side tubulation 20. Either of the above-described evaporators may be employed, however the procedure is described with reference to the first embodiment. The charge for the Vidicon comprises a small quantity of photoconductor placed within the boat 38 at approximately its center. The open end 21 of the tubulation 20 is then sealed. The evaporator is retained in retracted position near the sealed end of the side tube 20, and the tube envelope 11 and its included electrodes and other components are processed in conventional fashion. The evaporator is thus retracted so that the chemical charge may be maintained at room temperature and not be adversely affected by the tube processing steps.

In general, in being processed, the tube 11 is exhausted and sealed and then baked to degas and dehydrate the envelope and its contents. Baking may be effected by any suitable means, for example, by a split oven which comprises two arcuate oven portions placed around the envelope 11. The tube is baked at approximately 400° C. to 450° C. for about one hour. Next the getters 27 and electrodes 12 are degassed by a suitable procedure. Other processing steps may be included as required.

After the tube has been processed, the evaporator 22 is moved by a magnet or other suitable means into the tube 11 until the leading end 28 contacts the inner wall of the electrode 14 and the chemical charge 23 is located within the tube 11 in position to be evaporated onto the target. In this position, the opening 39 of the boat 38 faces in the direction of the coated inner surface of the face plate 15. In addition, in this position of the evaporator, the contact wings 30, 31 contact and rest on the terminal pins 32, 33 in the side tubulation 20 and an electrical circuit is completed through the evaporator. Heating current flows from one side of the source 34 through the pin 32, the wing 30, the rod 46, the arcuate member 40, the end piece 44, the arcuate member 42, the rod 48, the wing 31, the pin 33 to the other side of the source 34. The current may be controlled by a rheostat (no shown) to provide the exact current flow desired to heat the arcuate members 40 and 42 hot enough to evaporate the chemical charge and achieve the desired photoconductive film thickness. The heating temperature for selenium is approximately 200° C. and for antimony trisulfide approximately 650° C. The chemical evaporates through the opening 39 of the boat 38 and onto the inner surface of the face plate target 15. After the chemical material has been evaporated as desired, the evaporator 22 is withdrawn into the side tube 20 which is then sealed off.

After the photoelectric film has been prepared, the tube may be further processed to completion as needed, as by the getters being flashed and the like.

It is clear from the foregoing discussion that the apparatus of this invention utilizes direct electrical current flow to provide heat for evaporating the substance to be coated on a target. Such an arrangement allows the use of a measuring instrument in the electrical heating circuit and provides a method for obtaining strict control of the heating current.

What is claimed is:

1. Apparatus for evaporating materials onto a predetermined area inside an envelope, said apparatus comprising an elongated container adapted to be attached to and communicate with the interior of said envelope, electrical terminal means positioned in the wall of said container, an evaporator assembly movably positioned within said container, and means carried by said assembly for contacting said electrical terminal means when said assembly is moved to register said means carried by said assembly with said terminal means.

2. Apparatus for evaporating materials onto a predetermined target area inside an envelope, said apparatus comprising an elongated container adapted to be attached to and communicate with the interior of said envelope, electrical terminals positioned in the wall of said container, an evaporator assembly positioned for relative movement within said container, and contacts carried by said assembly and adapted to coact with said electrical terminals when said assembly is moved to register said contacts with said terminals whereby an electrical circuit is completed therethrough.

3. An evaporator assembly comprising an electrically conductive support, an insulator carrier for containing a quantity of vaporizable material, said carrier being in contact with said electrically conductive support, said electrically conductive support including means slidably supporting said carrier, and means connected to said electrically conductive support for feeding electrical current thereto, whereby said material may be heated and vaporized.

4. An evaporator assembly comprising an elongated U-shaped conductive support, the legs of said support adjacent the closed end thereof including arcuate heater strips, an insulator receptacle for containing a vaporizable material, said receptacle being in contact with and supported between said arcuate strips whereby heat developed in said arcuate strips may be transferred to said receptacle to vaporize said material, and means on the legs of said U-shaped support adapted to be connected to a source of electrical energy to heat said strips.

5. An evaporator assembly comprising an elongated conductive support having a pair of spaced legs, means conductively joining said legs at one end thereof, an insulator receptacle for containing a vaporizable material, said receptacle being in contact with and slidably supported between the legs of said support adjacent the joined ends thereof, whereby heat developed in said support may be transferred to said receptacle to vaporize said material, and an insulator member fixed between said legs of said support to insulatingly separate said legs, said legs being adapted to be connected to a source of electrical energy to heat said receptacle.

6. An evaporator assembly comprising an elongated U-shaped conductive support, an insulator receptacle for containing a vaporizable material, said receptacle being in contact with and slidably supported between the legs of said support adjacent the closed end of said support for transferring heat developed in said support to said receptacle to vaporize said material, the legs of said support being insulatingly separated and supported by an insulator means, and electrical conductors connected to the legs of said U-shaped member and adapted to be connected to a source of electrical energy to heat said receptacle.

7. An evaporator assembly comprising an insulator boat for containing a quantity of vaporizable material, a pair of parallel electrical conductors contacting and slidably supporting said boat therebetween, means connected across adjacent ends of said conductors at one end thereof for providing an electrical circuit therebetween, an insulator supporting means connected to said conductors and positioned between portions of the other ends of said conductors, and electrical contact means connected to said conductors for feeding an electrical current thereto whereby an electrical circuit may be completed through said conductors and whereby said material may be heated and vaporized.

8. An evaporator assembly comprising a tubular-shaped boat for containing a quantity of vaporizable material, said boat having a rectangular opening extending along its length, a pair of parallel arcuate-shaped members of highly resistant material contacting and supporting said boat therebetween and substantially enclosing said boat so that said rectangular opening of said boat lines up with a spacing between said arcuate-shaped members, a conductive end piece connected across adjacent ends of said arcuate-shaped members at one end thereof for providing an electrical circuit therebetween, a pair of parallel conductors connected to said arcuate-shaped members at the other end thereof and extending longitudinally therefrom, an insulator support means connected to said conductors and positioned therebetween, and electrical contact means connected to said conductors for feeding electrical current thereto whereby an electrical circuit may be completed to said conductors and arcuate-shaped members to heat said arcuate-shaped members and hence said boat to vaporize said material.

9. Apparatus for evaporating materials onto a predetermined target area within an electron discharge device having an envelope, said apparatus comprising an elongated side tubulation adapted to be attached to the wall of said envelope and to communicate with the interior of said envelope, a pair of electrical terminal pins mounted in the wall of said tubulation, and an evaporator assembly positioned for relative movement within said side tubulation, said evaporator assembly including an electrically conductive support, an insulator carrier for containing a quantity of vaporizable material, said carrier being in contact with said electrically conductive support, said electrically conductive support including means slidably supporting said carrier, and a pair of electrical contacts connected to said electrically conductive support and adapted to coact with said terminal pins when said evaporator is moved to register said contacts with said pins whereby an electrical circuit may be completed through said pins and said contacts.

10. Apparatus for evaporating materials onto a predetermined target area within an electron discharge device having an envelope, said apparatus comprising an elongated side tubulation adapted to be attached to the wall of said envelope and to communicate with the interior of said envelope, a pair of electrical terminal pins mounted in the wall of said tubulation, and an evaporator assembly positioned for relative movement within said side tubulation, said evaporator assembly including an elongated conductive support having a pair of spaced legs, means conductively joining said legs at one end thereof, an insulator receptacle for containing a vaporizable material, said receptacle being in contact with and slidably supported between the legs of said support adjacent the joined ends thereof, whereby heat developed in said support may be transferred to said receptacle to vaporize said material, an insulator member fixed between said legs of said support to insulatingly separate said legs, and a pair of electrical contacts connected to the legs of said support and adapted to coact with said terminal pins when said evaporator is moved to register said contacts with said pins whereby an electrical heating circuit may be completed through said evaporator assembly to vaporize said material.

References Cited in the file of this patent

UNITED STATES PATENTS

| | | |
|---|---|---|
| 859,021 | Soddy | July 2, 1907 |
| 1,582,217 | Henry | Apr. 27, 1926 |
| 1,623,323 | Van Voorhis | Apr. 5, 1927 |
| 1,783,279 | Burnham | Dec. 2, 1930 |
| 1,991,510 | Laise | Feb. 19, 1935 |
| 2,667,600 | Goff | Jan. 26, 1954 |